United States Patent
Cao et al.

(10) Patent No.: US 10,176,165 B2
(45) Date of Patent: Jan. 8, 2019

(54) DISAMBIGUATION IN MENTION DETECTION

(71) Applicant: International Business Machines Corporation, Armonk, NY (US)

(72) Inventors: Feng Cao, ShangHai (CN); Yuan Ni, Shanghai (CN); Noam Slonim, Jerusalem (IL); Qiongkai Xu, Shanghai (CN); Hui Jia Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/926,260

(22) Filed: Oct. 29, 2015

(65) Prior Publication Data

US 2016/0124939 A1     May 5, 2016

(30) Foreign Application Priority Data

Oct. 31, 2014    (CN) .......................... 2014 1 0601824

(51) Int. Cl.
    *G06F 17/27*          (2006.01)
    *G06F 17/30*          (2006.01)

(52) U.S. Cl.
    CPC ................... *G06F 17/278* (2013.01)

(58) Field of Classification Search
    CPC ................... G06F 17/27; G06F 17/30

(Continued)

(56) References Cited

U.S. PATENT DOCUMENTS 7,672,833 B2 *   3/2010   Blume ................ G06F 17/278
                                                       704/10
7,685,201 B2 *   3/2010   Zeng ................ G06F 17/30696
                                                       704/9

(Continued)

FOREIGN PATENT DOCUMENTS

CN        101295294 A      10/2008
CN        103984771 A      8/2014

OTHER PUBLICATIONS

Hoffart et al., "Robust disambiguation of named entities in text." Proceedings of the Conference on Empirical Methods in Natural Language Processing. Association for Computational Linguistics, 2011.*

(Continued)

*Primary Examiner* — Seong Ah A Shin
(74) *Attorney, Agent, or Firm* — Cantor Colburn LLP; Rabin Bhattacharya

(57) ABSTRACT

Disambiguation in mention detection. The method includes: determining at least one location in a text at which a target surface form in the text appears; obtaining an overall word-bag context of the target surface form in the text, the word-bag context at each of the at least one location including words within a predetermined neighborhood of the location; obtaining an overall resource context of the target surface form in the text, the resource context at each of the at least one location including resources corresponding to a further surface form within a predetermined neighborhood of the location; and determining a similarity between the target surface form and a candidate resource for the target surface form based on the overall word-bag context and the overall resource context. A system for disambiguation in mention detection is also provided.

13 Claims, 3 Drawing Sheets

(58) Field of Classification Search
USPC .............................. 704/9, 10; 707/706, 739
See application file for complete search history.

(56) References Cited

U.S. PATENT DOCUMENTS

| | | | | |
|---|---|---|---|---|
| 7,962,465 | B2* | 6/2011 | Kraft | G06F 17/3061 707/706 |
| 8,234,106 | B2* | 7/2012 | Marcu | G06F 17/2735 704/10 |
| 8,538,898 | B2* | 9/2013 | Lu | G06F 17/30616 706/12 |
| 9,135,238 | B2* | 9/2015 | Bunescu | G06F 17/278 |
| 9,830,379 | B2* | 11/2017 | Gupta | G06F 17/3064 |
| 2006/0009963 | A1* | 1/2006 | Gaussier | G06F 17/2735 704/7 |
| 2007/0233656 | A1* | 10/2007 | Bunescu | G06F 17/278 |
| 2010/0185689 | A1 | 7/2010 | Hu et al. | |
| 2011/0106807 | A1* | 5/2011 | Srihari | G06F 17/30604 707/739 |
| 2014/0142922 | A1* | 5/2014 | Liang | G06F 17/21 704/9 |
| 2015/0227505 | A1* | 8/2015 | Morimoto | G06F 17/2785 704/9 |
| 2016/0344770 | A1* | 11/2016 | Verma | H04L 63/1483 |

OTHER PUBLICATIONS

Han et al, "Named Entity Disambiguation by Leveraging Wikipedia Semantic Knowledge", Institute of Automation, Chinese Academy of Science.
Hoffart et al, "Robust Disambiguation of Named Entities in Text", Proceedings of the Conference on Empirical Methods in Natural Language Processing, pp. 782-792.
Hoffart et al, "KORE: Keyphrase Overlap Relatedness for Entity Disambiguation", Proceedings of the 21st ACM international conference on Information and knowledge management, pp. 545-554.
Xinhui, "A Study of Concept-based Information Retrieval Model", National Engineering Research Center for E-learning, Huazhong Normal University, May 2012.

* cited by examiner

DISAMBIGUATION IN MENTION DETECTION

CROSS-REFERENCE TO RELATED APPLICATION

This application claims the benefit of priority to Chinese Patent Application No. 201410601824.4, filed Oct. 31, 2014, the contents of which are incorporated herein by reference.

BACKGROUND

The present invention is related to the field of information processing, and more specifically, to a method and system for disambiguation in mention detection.

Mention detection is a kind of method for processing text information. Mention detection is used for automatically detecting mentions of various entities such as name of a person, name of a place, an organization and the like, and mapping these mentions to resources associated with the entities. As an example, if a mention detection tool detects a mention of a name of person "Michael Jordan" in a text, the mention can be linked to a web page regarding "Michael Jordan" in a web dictionary as an example. During use, for example, when a user places a cursor on or near such a mention, a uniform resource indicator (URI) of a corresponding resource can be displayed to the user.

An important step in mention detection is disambiguation. Mentions for a same entity can have different surface forms. For example, mentions of the entity "Michael Jordan" can be "Jordan," "Michael," "Air Jordan," "MJ," and the like. In the meantime, mentions of different entities can have a same surface form. For example, the surface form for the mention of "Michael Jordan" can also be "MJ." The objective of disambiguation operation is determining a mention of a given text should be mapped to a resource corresponding to which entity. For example, the surface form "MJ" should be linked to the resource of "Michael Jordan" or "Michael Jackson."

In a traditional disambiguation algorithm, only a priori probability for a surface form belonging to a candidate probability and a context score are usually concerned. The context score is a score of similarity between words appearing around a surface form and words appearing around a mention of a candidate resource. However, in such traditional method, considerable useful information in the text is not sufficiently utilized. Therefore, the accuracy and effect of disambiguation needs to be improved.

SUMMARY

Generally, aspects of the present invention provide a technical solution of variable tracking in program debugging.

In one aspect of the present invention, there is provided a method for disambiguation in mention detection. The method includes: determining at least one location in a text at which a target surface form in the text appears; obtaining, based on a word-bag context for the target surface form at each of the at least one location, an overall word-bag context of the target surface form in the text, the word-bag context at each of the at least one location including words within a predetermined neighborhood of the location; obtaining, based on a resource context of the target surface form at each of the at least one location, an overall resource context of the target surface form in the text, the resource context at each of the at least one location including resources corresponding to a further surface form within a predetermined neighborhood of the location; and determining a similarity between the target surface form and a candidate resource for the target surface form based on the overall word-bag context and the overall resource context.

In another aspect, there is provided a system for disambiguation in mention detection. The system includes: a surface form location determining unit configured to determine at least one location in a text at which a target surface form in the text appears; a word-bag context obtaining unit configured to obtain, based on a word-bag context for the target surface form at each of the at least one location, an overall word-bag context of the target surface form in the text, the word-bag context at each of the at least one location including words within a predetermined neighborhood of the location; a resource context obtaining unit configured to obtain, based on a resource context of the target surface form at each of the at least one location, an overall resource context of the target surface form in the text, the resource context at each of the at least one location including resources corresponding to a further surface form within a predetermined neighborhood of the location; and a disambiguation unit configured to determine, based on the overall word-bag context and the overall resource context, a similarity between the target surface form and a candidate resource for the target surface form.

According to yet another aspect of the present invention, there is provided a computer readable non-transitory article of manufacture tangibly embodying computer readable instructions which, when executed, cause a computer to carry out at least one step of a method for disambiguation in mention detection.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein.

In respective figures, same or like reference numerals are used to represent the same or like components.

DETAILED DESCRIPTION

Some preferable embodiments will be described in more detail with reference to the accompanying drawings, where the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
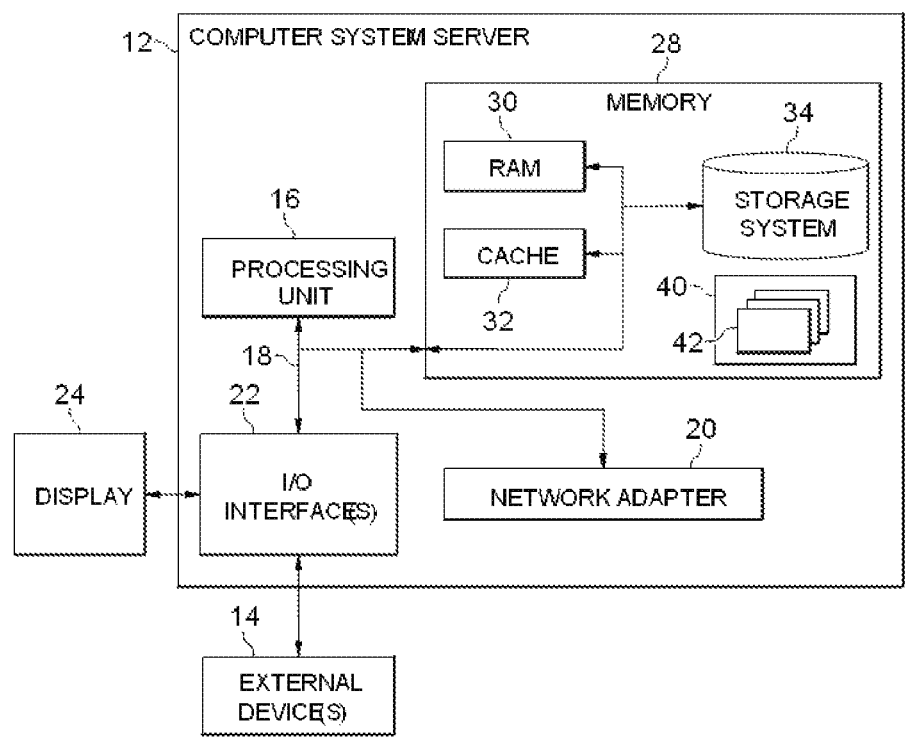
FIG. 1 shows an exemplary computer system/server which is applicable to implement embodiments of the present invention.

Referring now to FIG. 1, where an exemplary computer system/server 12 which is applicable to implement embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, at least one processors or processing units 16, a system memory 28, and a bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, at least one application programs, other program modules, and program data. Each of the operating system, at least one application programs, other program modules, and program data or some combination thereof, can include an implementation of a networking environment. Program modules 42 generally carry out the functions and/or methodologies of embodiments of the invention as described herein.

Computer system/server 12 can also communicate with at least one external devices 14 such as a keyboard, a pointing device, a display 24, etc.; at least one devices that enable a user to interact with computer system/server 12; and/or any devices (e.g., network card, modem, etc.) that enable computer system/server 12 to communicate with at least one other computing devices. Such communication can occur via Input/Output (I/O) interfaces 22. Still yet, computer system/server 12 can communicate with at least one networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples include, but are not limited to: microcode, device drivers, redundant processing units, external disk drive arrays, RAID systems, tape drives, and data archival storage systems, etc.

Hereinafter, the mechanism and principle of embodiments of the present invention will be described in detail. Unless otherwise stated, the term "based on" used hereinafter and in the claims expresses "at least partially based on." The term "comprise" or "include" or a similar expression indicates an open inclusion, i.e., "including, but not limited to . . . ." The term "plural" or a similar expression indicates "two or more." The term "one embodiment" indicates "at least one embodiment." The term "another embodiment" indicates "at least one another embodiment." Definitions of other terms will be provided in the description infra.

Figure 2:
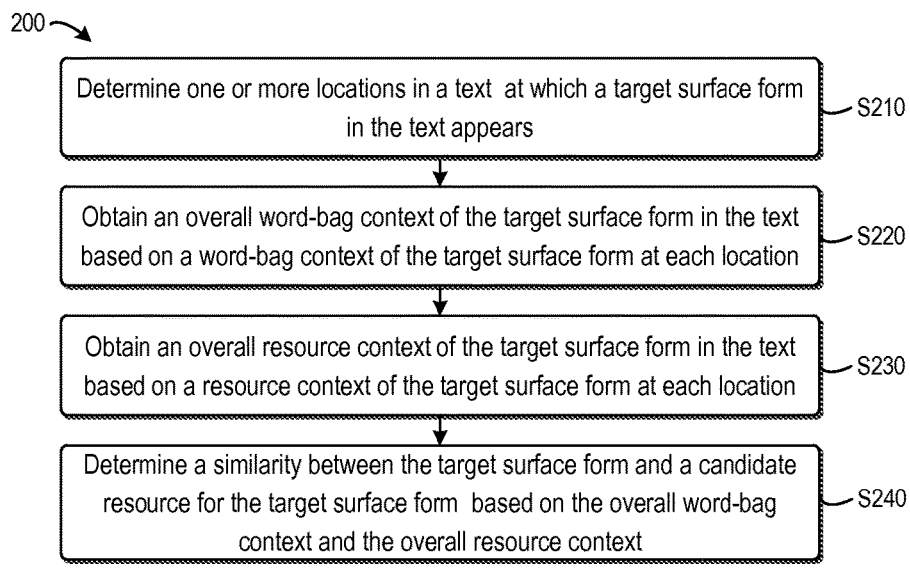
FIG. 2 shows a schematic flow diagram of a method for disambiguation in mention detection according to the embodiments of the present invention.

FIG. 2 shows a method for disambiguation in mention detection according to an exemplary embodiment of the present invention. Method 200 starts from step S210, where at least one locations of a target surface form in a text which appears in the context is determined. The term "surface form" used here refers to a specific appearance of a mention detected in a text. For example, surface forms for the mention of the resource of the entry "Phil Douglas Jackson" in a web dictionary can be "Phil," "Phil Jackson," "The Zen Master," etc. In the description below, at the ease of discussion, a surface form to be processed is called "a target surface form." Additionally, at the ease of discussion, the terms "mention" and "form surface" can be used interchangeably.

A mention can be identified based on a keyword discovery or spotting technology. Any currently known or future developed spotting technology can be used in combination with the embodiments of the present invention. As an example, a surface form of a mention in a text can be identified using a vocabulary. Spotting technology is not a focus of the present invention, which therefore will not be detailed here so as not to confuse the subject matter of the present invention.

For the target surface form being processed in step S210, the surface form can be searched within an appropriate range of a text so as to determine a location where the target surface form appears. In one embodiment, the target surface form can be searched in a natural paragraph in the text. However, semantic information included in the paragraph might be insufficient. Therefore, in one embodiment, the target surface form can be searched in a plurality of paragraphs in an article or even the entire to-be-processed article. In this way, the semantic information of the entire article, rather than a single paragraph, can be used to construct a context of the surface form. This helps significantly improve the accuracy of disambiguation.

Figure 3:
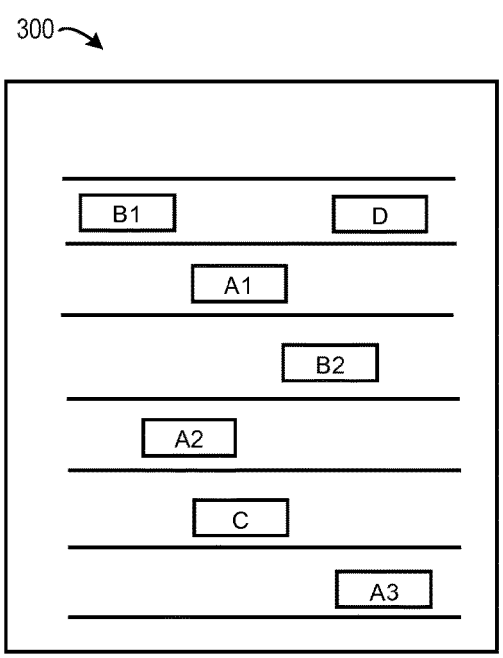
FIG. 3 shows a schematic diagram of a text and a to-be-disambiguated surface form according to the embodiments of the present invention.

FIG. 3 shows an example. In an article 300, suppose a surface form A of a mention appears at three locations in the article 300, namely, A1, A2, and A3. For example, if the target surface form is "MJ," in the example shown in FIG. 3, the target surface form "MJ" appears at A1, A2, and A3. It should be understood that the example as shown in FIG.

3 is only for the purpose of discussion, not intended to limit the scope of the present in any manner. The target surface form can appear at any at least one locations in the article. Additionally, it is only exemplary to use English as an exemplary target language, not intended to limit the scope of the present invention in any manner. The embodiments of the present invention are applicable to any appropriate target language.

It can be understood that in step S210, search is stopped responsive to finding a location where a target surface form appears. Alternatively, a plurality of locations where the target surface form appears can be searched within a designated area of the text. If a plurality of locations where the target surface form appears in the text are considered, the executed disambiguation is substantively a "group disambiguation." In other words, context information provided by multiple times of appearance of the target surface form will be combined for disambiguation. Otherwise, if only appearance of a target surface formation at a single location is considered, the executed disambiguation is an individual disambiguation. In other words, only the context information around a location of the target surface form is considered. Both group disambiguation and individual disambiguation fall within the scope of the present invention.

Continue reference to FIG. 2. Method 200 proceeds to steps S220 and S239, where a word-bag context and a resource context for the target surface form are obtained, respectively. It can be appreciated that although the two steps in FIG. 2 have a priority order, it is only for the convenience of discussion. The word-bag context and the resource context can be obtained according to any appropriate order.

In step S220, an overall word-bag context of the target surface form in the text block is obtained based on the word-bag context of the target surface form at each location. A word-bag context of the target surface form at any given location includes at least one words within a predetermined neighborhood of the location. An unordered set formed by these words is the word-bag context for the surface form at the location.

According to the embodiments of the present invention, a neighborhood of the location where the target surface form appears can be determined by word distance. For example, in one embodiment, a predetermined number of words before and after the given location are included within a word-bag. In the example shown in FIG. 3, it is supposed that a word distance for defining a neighborhood is two. In this case, for any one of locations A1, A2, and A3, a word-bag context is formed by two words before and two words after the location, respectively. As an example, suppose at location A1, two words before the surface form "MJ" are "super" and "star," while two words thereafter are "Chicago" and "basketball." At this point, the word of bag context at the location A1 can be expressed as a set {"super", "star", "Chicago", "basketball"}. Similarly, the word-bag context at other locations A2 and A3 can be determined.

Based on the word-bag context at least one location where the target surface appears, an overall word-bag context of the target surface form in the considered text region can be obtained. For example, in one embodiment, the word-bag contexts of the target surface form at different locations can be merged so as to generate an overall word-bag context. In the example described in FIG. 3, sets representing the word-bag context at respective locations can be subject to a union operation. Of course, any other appropriate manner is also feasible. For example, in one embodiment, those words appearing in all or a predetermined number of word-bag contexts can be selected, and these selected words can be used to form the overall word-bag context for the target surface form.

In particular, in one embodiment, for each word in the overall word-bag context, a weight for the word can be calculated. The weight represents the importance of the associated word in the subsequent disambiguation operation. The weight of a word can be determined based on any appropriate method. In one embodiment, term frequency (TF) of a word can be determined based on any appropriate method. The term frequency of a word refers to the frequency of the word appearing in a word-bag context. Alternatively or additionally, in one embodiment, an inverse document frequency (IDF) can be used to calculate the weights of a word. The inverse document frequency is the weight of a word's general importance. The IDF of a particular word can be determined based on a ratio between the times of the word appearing in the considered text area and a number of the word-bag context of the target surface form including the word. In particular, in one embodiment, the weight of the word can be defined as a product between TF and IDF. Any other appropriate weight defining manner is feasible. For example, in one embodiment, the weight of a word can be predefined and stored or designated by the user.

In step S230, based on a resource context of the target surface form at each of the at least one location, an overall resource context of the target surface form in the considered text area is obtained. It can be appreciated that around the surface form in consideration, mention of other entity can exist, each mention having a corresponding surface form. Correspondingly, such mentions correspond to respective resources. For example, in the example shown in FIG. 3, at locations B1 and D within a designated neighborhood of the surface form "MJ" appearing at location A1, there are mentions of other entities. Specifically, the surface form "Phil Jackson" appears at location B1, while the surface form "NBA" appears at location D. the two mentions can be mapped to resources, respectively, e.g., the entries "Phil Douglas Jackson" and "National Basketball Association" in the web dictionary.

In the traditional solution, these pieces of resource information around the target surface form are not considered. The inventors notice that besides the word-bag context, mentions of other resources around the target surface form constitute useful context information, which is called "resource context." The resource context helps identify the correspondence relationship between the target surface form and a candidate resource, thereby improving accuracy of disambiguation.

Specifically, a resource context of a target surface form at any one of given locations includes at least one other mentions within a predetermined neighborhood of the location, each mention having a corresponding surface form. An unordered set formed by resources corresponding to these other mentions are word-bag context of the surface form at the location. For example, in an example described above, the resource context of the surface form "MJ" at the location A1 can be expressed as a set {"Phil Douglas Jackson", "National Basketball Association"}. In particular, it can be appreciated that the neighborhoods for obtaining a word-bag context in step S220 and the neighborhoods for obtaining a resource context in step S230 can be identical or different.

Based on the resource context at at least one locations where the target surface form appears, the overall resource context of the target surface form in the considered text area can be obtained. For example, in one embodiment, the resource contexts of the target surface form at different locations can be merged so as to generate an overall resource context. In the example described in FIG. 3, sets representing the resource context at respective locations are subject to a union operation. Of course, any other appropriate manner is also feasible. For example, in one embodiment, those resources appearing in all resource contexts or in resource context exceeding a predetermined number can be selected, and the selected resources are used to form the overall resource context.

Similar to the word-bag context, each resource in the resource context can have a corresponding weight. In one embodiment, the weight of each resource in the resource context can be determined based on a TF and/or IDF of the resource. For example, in one embodiment, the weight of each resource can be defined as a product between TF and IDF. Any other appropriate manner is also feasible.

Continue reference to FIG. 2. Method 200 proceeds to step S240, where a similarity between the target surface form and a candidate resource for the mention is determined based on the overall word-bag context determined in step S220 and the overall resource context determined in step S230.

A target surface form can have at least one potential candidate resources. In other words, the target surface form can be mapped to one of these candidate resources. An objective of disambiguation at step S240 is calculating a similarity between the target surface form and each candidate resource. In this way, it can be believed that the resource having the highest similarity is the resource of the mention corresponding to the target surface form.

According to the embodiments of the present invention, a word-bag context and a resource context can be generated for each candidate resource through a corpus-based training. Specifically, for each candidate resource, at the training phase, a plurality of articles can be collected as training corpus, these articles containing at least one surface forms of the mention of the candidate resource. Afterwards, an overall word-bag context and an overall resource context of the candidate resource can be established according to the methods described above with reference to steps S220 and S230.

In particular, in one embodiment, when obtaining the resource context of the candidate resource, besides the articles used as training corpus, other usable knowledge can also be considered. For example, in some web dictionaries, relationships between different resources have been established in advance through a manner such as manual annotation. For example, in some cases, the predefined relationship between resources can be stored into a knowledge graph. Alternatively or additionally, an abstracted description for resources can exist, including mentions of other resources. As an example, for the resource "Michael Jordan," the web dictionary can define a relationship between the resource and other resources in advance, e.g., the relationship between "Phil Douglas Jackson" and other resources such as "National Basketball Association." For example, this relationship can be described in an abstract for the resource "Michael Jordan" or implemented as a knowledge graph. These pieces of information can all be used for establishing a resource context of the candidate resources.

Moreover, in one embodiment, each word in the word-bag context of the candidate resource and/or each resource in the resource context can be assigned a predetermined weight. A manner of determining the weight can be similar to the manner described above with reference to steps S220 and S230. For example, for each word in the word-bag context of the candidate resource and each resource in the resource context, TF and/or IDF (e.g., the product between TF and IDF) can be used to determine the weight.

Figure 4:
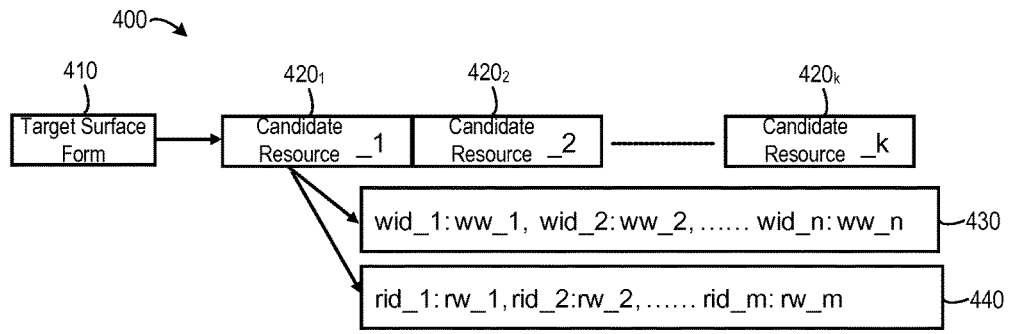
FIG. 4 shows a schematic diagram of an index of a surface form according to the embodiments of the present invention.

In one embodiment, the candidate resource of each target surface form and its word-bag context and resource context can be predetermined and stored in an index for the target surface form. As an example, FIG. 4 shows an example of an index 400 for a target surface form i. The index 400 includes a surface form field 410 and at least one candidate resource fields $420_1, 420_2, \ldots, 420_k$ (k is a natural number). Each candidate resource field 420 stores a candidate resource associated with a target surface form in the surface form field 410.

In one embodiment, each candidate resource field 420 can at least include two sub-fields. The sub-field 430 is for storing word-bag context information. For example, in this sub-field, identifiers wid_1, wid_2, ..., wid_n of each word contained in the word-bag context and weights ww_1, ww_2, ..., ww_n (n is an integer) of each word can be stored. Another sub-field 440 is for storing resource context information. For example, in that sub-field, identifiers rid_1, rid_2, ..., rid_m of each resource contained in the resource context and weights rw_1, rw_2, rw_m (m is an integer) of each resource can be stored.

By using the index structure of FIG. 4, when a target surface form is processed, candidate resources and context information of each candidate resource can be quickly retrieved through accessing an associated index. However, it can be appreciated that the index structure as shown in FIG. 4 is only exemplary, not intended to limit the scope of the present invention in any manner. Any appropriate index structure can be used in combination with the embodiments of the present invention, regardless of what is currently known or future developed. Moreover, in one embodiment, the word-bag context and the resource context information of the candidate resource can even not be pre-stored in the index, but calculated dynamically in use.

Still in reference to FIG. 2, in step S240, a similarity (or matching degree) between the target surface and the candidate resource can be determined based on the overall word-bag context and the overall resource context of the target surface form, as well as based on the word-bag context and the resource context of the candidate resource. For example, in one embodiment, a vector called "surface form context vector" can be constructed based on the overall word-bag context and the overall resource context of the target surface form. Each word in the overall word-bag context vector and each resource in the overall resource context can be used as an element in the surface form context vector. Similarly, a context vector (which can be called "candidate resource context vector") of the resource can be constructed based on the word-bag context of the candidate resource and the resource context.

Afterwards, a similarity between the surface form context vector of the target surface form and the candidate resource context vector of the candidate resource can be compared, thereby determining the similarity between the target surface form and the candidate resource. As mentioned above, in one embodiment, each element (word and/or resource) in the surface form context vector and candidate resource context vector has its own weight, wherein the weight indicates importance of a corresponding element. In such embodiment, in step S240, a similarity between two vectors can be determined based on weights (called "first set of weights") of elements in the surface form context vector and weights (called "second set of weights") of elements in the candidate resource context vectors. Specifically, in one embodiment, dot multiplication can be performed to the surface form context vector and the candidate resource context vector based on the two groups of weights so as to calculate the inner product of the two vectors. The result can be used as the similarity between the two vectors, namely, the similarity between the target surface form and the candidate resource. During dot multiplication, the weights of corresponding elements in the two vectors are multiplied. The operation principle and physical meaning of the inner product are known in the art, which will not be detailed here.

Alternatively, in one embodiment, a distance between the surface form context vector and the candidate resource context vector can be calculated, e.g., Euclidian distance, and a result thereof is used as a similarity between the two vectors. Any other appropriate manner of determining a similarity between two vectors is feasible, and the scope of the present invention is not limited in this aspect.

Additionally, in step S240, it is not necessary to combine the overall word-bag context of the target surface form and the overall resource context into a surface form context vector. Alternatively, in one embodiment, the word-bag context of the target surface form and the word-bag context of the candidate resource can be compared. Based on a result of comparison between the two, a similarity between the surface form and the candidate resource can be determined. For example, the results of the two comparisons can be combined by weighted averaging or any other appropriate manner.

In the above way, the candidate resource having a highest similarity with the target surface form can be regarded as a resource of the mention corresponding to the surface form. Therefore, the surface form can be mapped to the resource so as to complete disambiguation. By considering the resource context and optionally generating context information across multiple paragraphs, the accuracy of disambiguation can be significantly improved.

It can be appreciated that in actual use, the text can have a plurality of surface forms of more than one mention. These surface forms all need disambiguation processing. In one embodiment, these surface forms can be subject to disambiguation according to appearing sequences of the surface forms. Alternatively, the surface forms can be randomly selected for disambiguation. In order to enhance the accuracy of disambiguation, in one embodiment, a target surface form can be selected iteratively based on the order of the surface form.

Specifically, in such embodiment, for respective surface forms of a plurality of mentions in the text, an overall word-bag context of each surface form can be first determined. The method refers to step S220 of method 200. Afterwards, the surface form in the text can be subject to one round of disambiguation only using the overall word-bag context, thereby determining a similarity between a surface form and a respective candidate resource. Because useful information provided by the resource context is not considered, such similarity is called "coarse similarity."

Next, all unprocessed surface forms are sorted according to coarse similarities. In one embodiment, such surface form can be selected that the surface form per se has a low coarse similarity with a candidate resource, but other surface similarities in its surrounding neighborhoods have a higher coarse similarity of the corresponding candidate resource. As described in a quantitative manner, the coarse similarity between the selected target surface form and the candidate resource is lower than a threshold, and the coarse similarity between other surface forms of other mentions within a predetermined neighborhood of the target surface formality and a respective candidate resource is higher than a second threshold. Such practice is advantageous, because a high enough coarse similarity of a surrounding surface form will help enhance the accuracy of the resource context of the coarse surface formality.

Afterwards, method 200 can be applied to the selected target surface form. As a result, the target surface form will be mapped to the candidate resource have a highest similarity. In this way, the mapping relationship between the target surface form and the resource is determined. In the subsequent disambiguation process of other surface form, the resource of the current surface form can be reliably used. The above process can be iteratively repeated for a surface form that has not been disambiguated, till processing of all surface forms is completed.

Figure 5:
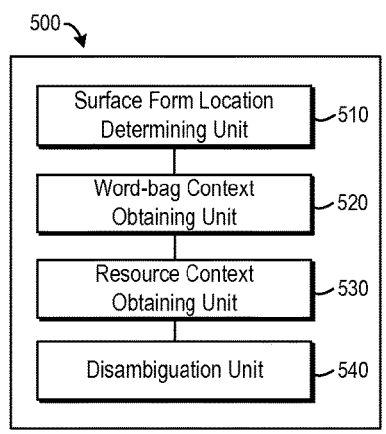
FIG. 5 shows a schematic block diagram of a system for disambiguation in mention detection according to the embodiments of the present invention.

FIG. 5 shows a schematic diagram of a system 500 for disambiguation in mention detection according to the embodiments of the present invention. As shown in the figure, system 500 includes: a surface form location determining unit 510 configured to determine at least one location in a text at which a target surface form in the text appears; a word-bag context obtaining unit 520 configured to obtain, based on a word-bag context for the target surface form at each of the at least one location, an overall word-bag context of the target surface form in the text, the word-bag context at each of the at least one location including words within a predetermined neighborhood of the location; a resource context obtaining unit 530 configured to obtain, based on a resource context of the target surface form at each of the at least one location, an overall resource context of the target surface form in the text, the resource context at each of the at least one location including resources corresponding to a further surface form within a predetermined neighborhood of the location; and a disambiguation unit 540 configured to determine, based on the overall word-bag context and the overall resource context, a similarity between the target surface form and a candidate resource for the target surface form.

In one embodiment, the word-bag context obtaining unit 520 can include a word-bag context merging unit configured to merge the word-bag contexts of the target surface form at the at least one location. In one embodiment, the resource context obtaining unit 530 can include a resource context merging unit configured to merge the resource contexts of the target surface form at the at least one location.

In one embodiment, the disambiguation unit 540 can include: a surface form context vector constructing unit configured to construct a surface form context vector of the target surface form based on the overall word-bag context and the overall resource context; a candidate resource context vector obtaining unit configured to obtain a candidate resource context vector of the candidate resource, the candidate resource context vector including an overall word-bag context and the overall resource context of the candidate resource; and a similarity determining unit configured to determine the similarity between the target surface form and the candidate resource based on the surface form context vector and the candidate resource context.

In one embodiment, the similarity determining unit can include: a first weight obtaining unit configured to obtain a first set of weights of elements in the surface form context vector, the first set of weights indicating importance of the elements in the surface form context vector; a second weight obtaining unit configured to obtain a second set of weights of elements in the candidate resource context vector, the second set of weights indicating importance of the elements in the candidate resource context vector; and an inner product calculating unit configured to calculate an inner product of the surface form context vector and the candidate resource context vector based on the first set of weights and the second set of weights, to determine the similarity between the target surface form and the candidate resource.

In one embodiment, the first weight obtaining unit can include a frequency based weight obtaining unit configured to calculate the weights based on at least one of a term of frequency (TF) and an inverse document frequency (IDF) of the elements in the surface form context vector.

In one embodiment, the candidate resource context vector obtaining unit includes an index accessing unit configured to obtain the candidate resource context vector from an index associated with the target surface form.

In one embodiment, the surface form location determining unit 510 can include a surface form determining unit. In one embodiment, the surface form determining unit can include: an initial word-bag context obtaining unit configured to obtain an overall word-bag context of each surface form in a plurality of surface forms in the text; a coarse similarity determining unit configured to determine, based on the overall word-bag context of each surface form in the plurality of surface forms, a coarse similarity between each surface form in the plurality of surface forms and a respective candidate resource; and a surface form selecting unit configured to select the target surface form from among the plurality of surface forms, such that the coarse similarity of the target surface form is lower than a first threshold, and the coarse similarity of a further surface form within a predetermined neighborhood of the target surface form is higher than a second threshold.

It should be noted that for the sake of clarity, FIG. 5 does not show optional units or sub-units included in system 500. All features and operations as described above are suitable for system 500, respectively, which are therefore not detailed here. Moreover, partitioning of units or subunits in system 500 is exemplary, rather than limitative, intended to describe its main functions or operations logically. A function of one unit can be implemented by a plurality of other units; on the contrary, a plurality of units can be implemented by one unit. The scope of the present invention is not limited in this aspect.

Moreover, the units included in system 500 can be implemented by various manners, including software, hardware, firmware or a random combination thereof. For example, in some embodiments, the apparatus can be implemented by software and/or firmware. Alternatively or additionally, system 500 can be implemented partially or completely based on hardware. for example, at least one units in system 500 can be implemented as an integrated circuit (IC) chip, an application-specific integrated circuit (ASIC), a system on chip (SOC), a field programmable gate array (FPGA), etc. The scope of the present intention is not limited to this aspect.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Another aspect of the present invention includes a computer readable non-transitory article of manufacture tangibly embodying computer readable instructions which, when executed, cause a computer to carry out the above method.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes at least one executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

According to the aspects of the present invention, during a disambiguation process, not only the context information provided by a word can be utilized, but also resources mentioned around the to-be-processed surface form can be taken into consideration. Additionally, disambiguation can be implemented based on a cross-paragraph context of a surface form in a text. In this way, the context information will be more comprehensive and accurate. Further, in one embodiment, by reasonably determining a disambiguation sequence, the accuracy of disambiguation can be further enhanced.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for disambiguation in mention detection, comprising:

determining at least one location in a text at which a target surface form in the text appears, wherein the text is located in a first web resource;

training a word-bag context and a resource context, wherein the training comprises:
obtaining a training corpus, wherein the training corpus includes a plurality of articles, and wherein each of the plurality of articles include at least one of the target surface form; and
generating the word-bag context and the resource context based on the training corpus;

obtaining the word-bag context, in the text, for the target surface form at each of the at least one location, the word-bag context for the target surface form at each of the at least one location including words within a first predetermined neighborhood of the at least one location;

obtaining an overall word-bag context of the target surface form, wherein the overall word-bag context includes words that are present a first number of times exceeding a first pre-defined threshold in the word-bag context of the target surface form at each of the at least one location;

obtaining the resource context, in the text, for the target surface form at each of the at least one location, the resource context for the target surface form at each of the at least one location including resources corresponding to an ancillary surface form within a second predetermined neighborhood of the at least one location;

obtaining an overall resource context of the target surface form, wherein the overall resource context includes words that are present a second number of times exceeding a second pre-defined threshold in the resource context of the target surface form at each of the at least one location; and determining a similarity between the target surface form and a candidate resource for the target surface form based on the overall word-bag context and the overall resource context, wherein determining the similarity between the target surface form and a candidate resource for the target surface form based on the overall word-bag context and the overall resource context comprises:
constructing a surface form context vector of the target surface form based on the overall word-bag context and the overall resource context; and
obtaining a candidate resource context vector of the candidate resource, the candidate resource context vector including the overall word-bag context and the overall resource context of the candidate resource;

determining the similarity between the target surface form and the candidate resource based on the surface form context vector and the candidate resource context vector;

mapping the target surface form to the candidate resource based at least in part on the similarity between the target surface form and the candidate resource being above a threshold similarity, wherein the candidate resource comprises a second web resource; and outputting, via a user interface, the target surface form and candidate resource.

2. The method according to claim 1, wherein
obtaining an overall word-bag contexts of the target surface form in the text comprises merging the word-bag contexts of the target surface form at each of the at least one location; and obtaining an overall resource context of the target surface form in the text comprises merging the resource contexts of the target surface form at each of least one location.

3. The method according to claim 1, wherein determining the similarity between the target surface form and the candidate resource based on the surface form context vector and the candidate resource context vector comprises:
obtaining a first set of weights of elements in the surface form context vector, the first set of weights indicating importance of the elements in the surface form context vector;
obtaining a second set of weights of elements in the candidate resource context vector, the second set of weights indicating importance of the elements in the candidate resource context vector; and
calculating an inner product of the surface form context vector and the candidate resource context vector based on the first set of weights and the second set of weights, to determine the similarity between the target surface form and the candidate resource.

4. The method according to claim 3, wherein obtaining the first set of weights of elements in the surface form context vector comprises:
calculating the weights based on at least one of a term of frequency (TF) and an inverse document frequency (IDF) of the elements in the surface form context vector.

5. The method according to claim 1, wherein obtaining the candidate resource context vector of the candidate resource comprises:
obtaining the candidate resource context vector from an index associated with the target surface form.

6. The method according to claim 1, wherein determining at least one location in the text at which the target surface form in the text appears comprises:
obtaining an overall word-bag context of each surface form in a plurality of surface forms in the text;
determining, based on the overall word-bag context of each surface form in the plurality of surface forms, a coarse similarity between each surface form in the plurality of surface forms and a respective candidate resource; and
selecting the target surface form from among the plurality of surface forms, such that the coarse similarity of the target surface form is lower than a first threshold, and the coarse similarity of a further surface form within a predetermined neighborhood of the target surface form is higher than a second threshold.

7. A system for disambiguation in mention detection, comprising:
a processor communicatively coupled to a memory, the processor configured to:
determine at least one location in a text at which a target surface form in the text appears, wherein the text is located in a first web resource;
train a word-bag context and a resource context, wherein the training comprises:
obtain a training corpus, wherein the training corpus includes a plurality of articles, and wherein each of the plurality of articles include at least one of the target surface form; and
generate the word-bag context and the resource context based on the training corpus;
obtain the word-bag context, in the text, for the target surface form at each of the at least one location, the word-bag context for the target surface form at each of the at least one location including words within a first predetermined neighborhood of the at least one location;
obtain an overall word-bag context of the target surface form, wherein the overall word-bag context includes words that are present a first number of times exceeding a first pre-defined threshold in the word-gab context of the target surface form at each of the at least one location;
obtain the resource context of the target surface form, in the text, for the target surface form at each of the at least one location, the resource context for the target surface form at each of the at least one location including resources corresponding to an ancillary surface form within a second predetermined neighborhood of the at least one location;
obtain an overall resource context of the target surface form, wherein the overall resource context includes words that are present a second number of times exceeding a second pre-defined threshold in the resource context of the target surface form at each of the at least one location;
determine, based on the overall word-bag context and the overall resource context, a similarity between the target surface form and a candidate resource for the target surface form, wherein determining the similarity between the target surface form and a candidate resource for the target surface form based on the overall word-bag context and the overall resource context comprises:
constructing a surface form context vector of the target surface form based on the overall word-bag context and the overall resource context;
obtaining a candidate resource context vector of the candidate resource, the candidate resource context vector including the overall word-bag context and the overall resource context of the candidate resource; and
determining the similarity between the target surface form and the candidate resource based on the surface form context vector and the candidate resource context vector;
mapping the target surface form to the candidate resource based at least in part on the similarity between the target surface form and the candidate resource being above a threshold similarity, wherein the candidate resource comprises a second web resource and
output, via a user interface, the target surface form and candidate resource.

8. The system according to claim 7, wherein obtaining an overall word-bag contexts of the target surface form in the text comprises a word-bag context merging unit configured to merge the word-bag contexts of the target surface form at each of the at least one location; and the processor further configured to merge the resource contexts of the target surface form at each of the at least one location.

9. The system according to claim 7, wherein the determining the similarity between the target surface form and the candidate resource based on the surface form context vector and the candidate resource context vector comprises: the processor further configured to:

obtain a first set of weights of elements in the surface form context vector, the first set of weights indicating importance of the elements in the surface form context vector;

obtain a second set of weights of elements in the candidate resource context vector, the second set of weights indicating importance of the elements in the candidate resource context vector; and calculate an inner product of the surface form context vector and the candidate resource context vector based on the first set of weights and the second set of weights, to determine the similarity between the target surface form and the candidate resource.

10. The system according to claim 9, wherein the determining the similarity between the target surface form and the candidate resource based on the surface form context vector and the candidate resource context vector comprises: the processor further configured to: calculate the weights based on at least one of a term of frequency (TF) and an inverse document frequency (IDF) of the elements in the surface form context vector.

11. The system according to claim 7, wherein the obtaining the candidate resource context vector of the candidate resource comprises: the processor further configured to:

obtain the candidate resource context vector from an index associated with the target surface form.

12. The system according to claim 7, wherein the determining at least one location in the text at which the target surface form in the text appears comprises: the processor further configured to:

obtain an overall word-bag context of each surface form in a plurality of surface forms in the text;

determine, based on the overall word-bag context of each surface form in the plurality of surface forms, a coarse similarity between each surface form in the plurality of surface forms and a respective candidate resource; and select the target surface form from among the plurality of surface forms, such that the coarse similarity of the target surface form is lower than a first threshold, and the coarse similarity of a further surface form within a predetermined neighborhood of the target surface form is higher than a second threshold.

13. A computer readable non-transitory article of manufacture tangibly embodying computer readable instructions which, when executed, cause a computer to carry out at least one step of a method according to claim 1 for disambiguation in mention detection.

* * * * *